United States Patent [19]

Stevens

[11] Patent Number: 5,048,857
[45] Date of Patent: Sep. 17, 1991

[54] VERTICALLY COLLAPSIBLE FOOD SERVICE CART SYSTEM

[75] Inventor: Kenneth V. Stevens, Brooklyn, N.Y.

[73] Assignee: Colgate-Palmolive Company, Piscataway, N.J.

[21] Appl. No.: 426,833

[22] Filed: Oct. 26, 1989

[51] Int. Cl.$^5$ .............................................. B62B 3/10
[52] U.S. Cl. .................................. 280/651; 280/47.34; 280/79.2; 211/71; 108/111
[58] Field of Search ................. 280/651, 655, 35, 639, 280/47.35, 79.2, 79.3, 79.5, 638, 42, 47.34, 79.11; 211/4, 13, 60.1, 71, 96, 99, 86; 108/111, 117, 257 SM

[56] References Cited

U.S. PATENT DOCUMENTS

| | | | |
|---|---|---|---|
| 53,786 | 4/1866 | Colbert | 160/25 |
| 198,454 | 12/1877 | French | 108/111 |
| 827,540 | 7/1906 | Krahmer | 248/240 |
| 1,079,057 | 11/1913 | Meyer | 108/111 |
| 1,455,395 | 8/1921 | Exum | 312/198 |
| 1,858,857 | 6/1930 | Huntley | 211/10 |
| 2,010,278 | 8/1935 | Snyder | 211/96 |
| 2,146,413 | 1/1936 | Aron | 211/3 |
| 2,725,987 | 7/1952 | Howe | 211/3 |
| 2,784,999 | 3/1957 | Hunt | 296/22 |
| 2,800,127 | 7/1957 | Flynn | 126/141 |
| 2,850,341 | 9/1958 | Spinner | 311/3 |
| 2,926,794 | 12/1956 | Karoff | 211/149 |
| 3,101,731 | 8/1963 | Stiglin | 135/5 |
| 3,132,641 | 5/1964 | Schafer | 126/268 |
| 3,267,885 | 8/1966 | Shore | 108/112 |
| 3,318,269 | 5/1967 | Kinn | 108/112 |
| 3,347,184 | 10/1967 | Kiraly | 108/17 |
| 3,415,208 | 12/1968 | Thoreson | 108/94 |
| 3,436,092 | 4/1969 | Werner | 280/36 |
| 3,874,531 | 4/1975 | Mayo | 280/47.35 |
| 4,478,428 | 10/1984 | Ziliani | 280/651 |

FOREIGN PATENT DOCUMENTS

| | | | |
|---|---|---|---|
| 1308044 | 6/1969 | United Kingdom . | |
| 1165119 | 9/1969 | United Kingdom | 240/651 |

Primary Examiner—Andres Kashnikow
Assistant Examiner—Richard Camby
Attorney, Agent, or Firm—Richard J. Ancel; Robert C. Sullivan; Murray M. Grill

[57] ABSTRACT

An integrated food service cart system has a pair of upper panels and a pair of lower shelves supported on the frame pivotable between horizontal service positions and vertical storage positions, wherein the upper panels have spaces for holding chafer pans therein and pivotable support members extending below the spaces for holding chafer heating elements therein. The support members pivot into the spaces when the panels and shelves are pivoted to the vertical positions, thus assuming a slim profile for storage. Preferred features include a collapsible food shelf or coffee urn bridge mountable on the frame, clips on the undersides of the lower shelves for storing the chafer pans, and a collapsible awning assembly having vertical support tubes, risers telescoped into the support tubes, awning heads pivotably mounted on the risers with labyrinthine head bars extending between them, support arms pivotably mounted on the risers, stretcher bars mounted to the ends of the support arms, and an awning membrane stretched across the stretcher bars and through the head bars.

20 Claims, 7 Drawing Sheets

VERTICALLY COLLAPSIBLE FOOD SERVICE CART SYSTEM

FIELD OF THE INVENTION

This invention generally relates to food service carts, and more particularly, to an integrated cart system which is vertically collapsible for compact storage.

BACKGROUND ART

Food service carts generally are designed for service convenience and mobility so that they can be used in different locations and for a wide range of service functions. Such carts usually have an array of panels or shelves on which trays of food, utensils, and other items are placed. Some types of carts are made collapsible so that they can be stored in a relatively small floor space. For example, U.S. Pat. No. 3,436,092 issued to Werner shows a cart in which upper and lower panels on both sides of a cart are pivotable to upright positions, in conjunction with rotatable sleeve locking members and wheel assemblies which pivot inwardly, so that the cart assumes a slim vertical profile for storage. U.S. Pat. No. 4,478,428 issued to Ziliani shows an arrangement in which upper and lower panels are hinged to a pair of A-frames in parallel so that they can be rotated upright to vertical positions.

It has been desired to serve hot food and drink from food service carts so that they can be used for a wide range of service functions. This is currently done by placing chafer dishes, of the type having a flame heating element below a water pan, and containers of hot drink on the shelves of the cart. However, these added implements tend to clutter the shelves and compete for space with each other due to their non-complementary shapes and sizes. Also, when the carts are put away, the chafer dishes and drink containers are carried away to separate storage locations, while the cart may be collapsed and stored elsewhere, thereby resulting in inconvenience to the service personnel and requiring added storage space. Another version of food service cart has provision for mounting food trays and heating elements on the cart, such as shown in U.S. Pat. No. 3,132,641, for example, but is not made collapsible for storage.

Therefore, it is a principal object of the invention to provide an integrated food service cart system which is designed to hold chafer dish assemblies while in use and to allow the chafer dish assemblies to be stored on the cart in a vertically collapsed condition for storage. It is a further object of the invention to provide an integrated food service cart system in which the chafer dish assemblies have complementary shapes and structures which allow them to be used as well as stored on the cart in a highly compact arrangement. A particular object is to provide a food service cart structure in which upper and lower side panels and shelves are readily pivoted between horizontal use and vertical storage positions, and in which the chafer dish components can be stored entirely within the compact volume of the cart in its collapsed storage configuration.

SUMMARY OF THE INVENTION

The invention comprises an integrated food service cart system having a frame, at least one panel supported on said frame so as to be pivotable between a horizontal service position and a vertical storage position, said at least one panel having walls defining a space for holding a chafer pan therein, a support member pivotably mounted to said walls which extends below said chafer-pan holding space, wherein said support member has a retaining portion for holding a chafer heating element for applying heat to a chafer pan held in said space when said panel is in the horizontal service position, and pivot portions pivotably mounting said support member to said walls of said panel so as to allow said support member to be pivoted into said space when said panel is pivoted to the vertical storage position.

In a preferred embodiment, the cart frame is formed with a pair of vertical end sections spaced apart along a longitudinal axis of the cart and a stretcher bar extending between the end sections, a pair of upper panels each pivotably supported by respective opposing longitudinal ends thereof on said end sections so as to be pivotable in parallel with each other between the horizontal service positions and vertical storage positions, each of said upper panels having walls defining a plurality of spaces for holding respective chafer pans therein and mounting respective pivotable support members for the heating elements therefor, a pair of lower shelves each pivotably supported by respective opposing longitudinal ends thereof on said end sections, wherein said upper panels and lower shelves are pivotable to vertical storage positions one above the other flat against the stretcher bar of the cart frame and said support members for the heating elements are pivotable into the respective spaces defined by said panel walls, whereby the components of the cart are vertically collapsible into a slim vertical profile of the end sections for compact storage.

In the preferred embodiment, the vertical end sections include tubes with open socket ends for receiving the shouldered ends of support legs of a longitudinal, food shelf or coffee urn bridge so that the bridge can be mounted in an elevated position between and above the panels supporting the chafer pans. Sliding lock bars are inserted into holes formed in the vertical tubes and lock into recesses in the support legs of the bridge. The support legs pivot inwardly and fold into a hollow bridge channel for storage.

The chafer panels each have a pivoting structure including a back bar stop which abuts against the stretcher bar of the cart frame, and pivot slots formed on its opposite longitudinal ends in which the ends of pivot pins extending from the end sections are retained so that the panels are held by gravity in the horizontal position with the back bar stop in abutment with the stretcher bar, and can be pivoted upward and moved down along the length of the slots to hold them in the vertical position. The chafer pans are stored vertically by sliding them into clips on the undersides of the lower shelves.

Another feature of the invention is a collapsible awning assembly having vertical support tubes with lower ends fitting onto mounting plates on the cart frame, risers telescoped into the support tubes and held in selected vertical positions by threaded retaining elements, awning heads with labyrinthine head bars extending longitudinally between them and each having pivot brackets to which the risers are mounted to allow them to be folded inwardly along the longitudinal axis for storage, and collapsible awning support arms which are held outwardly by the tension of an awning membrane stretched across them and through labyrinthine head bars.

Other objects, features, and advantages of the present invention will become apparent from the following detailed description of the best mode of practising the invention when considered in conjunction with the drawings, as follows:

DESCRIPTION OF THE PREFERRED EMBODIMENTS

Figures 1, 2:
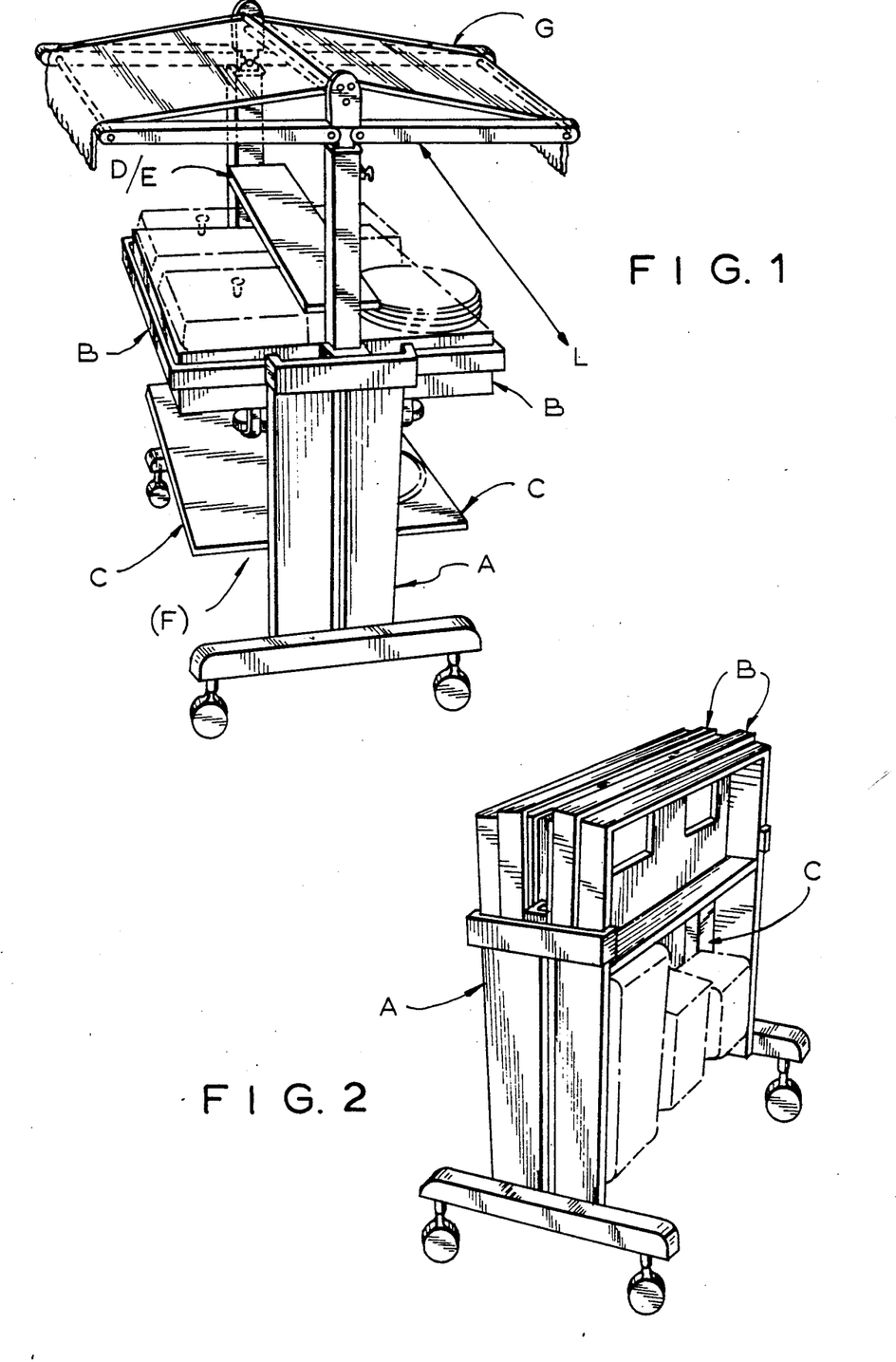
FIG. 1 is a perspective view of an integrated food service cart system in accordance with the invention arranged for food service.
FIG. 2 is a perspective view of the integrated food service cart system of FIG. 1 collapsed for compact vertical storage.

Referring to FIGS. 1 and 2, the integrated food service cart of the invention has the following subassemblies, each of which will be described under the correspondingly referenced subheadings below: (1) a cart frame A; (2) a pair of pivotable panels (chafer frames) B symmetrically arranged with respect to a longitudinal axis L of the cart at upper positions of the cart frame A; (3) a pair of symmetrically arranged, pivotable lower shelves C; (4) a removable and collapsible food shelf D or coffee urn bridge E supported on the frame A at an elevated position between the chafer frames B; (5) collapsible end shelves F (not shown in FIGS. 1 and 2) which can be mounted to each longitudinal end of the cart frame A for additional shelf space; (6) a removable and collapsible awning assembly G; and (7) miscellaneous chafer accessories H (not shown in FIGS. 1 and 2).

The cart system as shown in FIG. 2 has the upper chafer frames B and lower shelves C pivoted upright and collapsed within the confines of the cart frame A, and with the food shelf or coffee urn bridge D/E and awning assembly G are removed and collapsed for storage. Although the following detailed description is directed to a particular arrangement of subassemblies and structures for collapsing and storage, it is to be understood that the invention encompasses the broad principles disclosed relating to an integrated food service cart with a structure that can be vertically collapsed and on-board chafer assemblies which are stored on the cart within a compact storage volume.

A. Cart Frame

Figure 3:
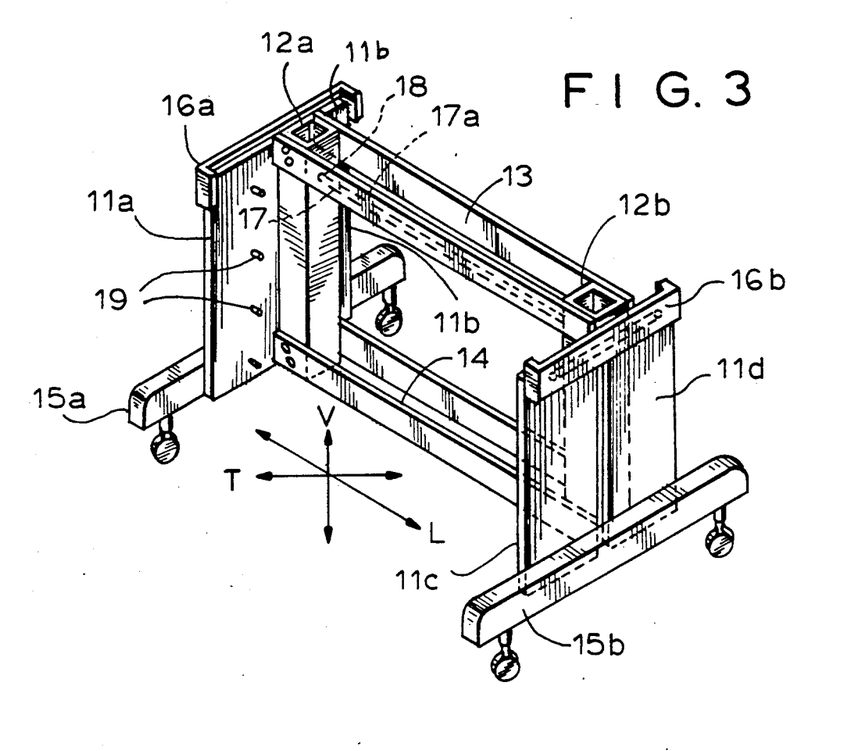
FIG. 3 is a schematic diagram of a preferred embodiment of the frame for the cart system of FIG. 1.

Referring to FIG. 3, the cart frame A is formed with paired vertical end sections 11a, 11b and 11c, 11d at opposing ends of the frame in the direction of the longitudinal axis L, vertical support tubes 12a, 12b which are spaced apart along the longitudinal axis, an upper stretcher bar 13 and a lower stretcher bar 14 in parallel with each other along the longitudinal axis, and base members 15a, 15b mounted on rollers for transport. The frame A also has end handle structures 16a, 16b which are also used to mount the awning assembly G, as described further below.

The support tubes 12a, 12b have open ends facing upward for receiving the shouldered ends of support legs for the food shelf D or coffee bridge E, as described further below. The support tubes can be made from standard extruded aluminum tube having a hollow rectangular cross-section. The tubes each have a punched hole 8 into which sliding bridge locks 17 are longitudinally inserted, by displacing the lever 17a, in order to lock into a selected one of vertically-spaced recesses formed in the support legs to lock them at a selected vertical height.

The upper stretcher bar 13 can be formed by two parallel aluminum bars secured to and spaced apart in the transverse direction T by a wood core with a plastic laminate top. The lower stretcher bar 14 can be an extruded aluminum angle bar.

The cart frame provides the structure support on which all the other assemblies are mounted, and also defines the minimum storage volume within which all assemblies are to be collapsed for storage. The cart frame components also cooperate with the other subassemblies to provide the respective mounting, locking, storage, pivoting, and/or collapsing functions which characterized the advantageous design and use of the cart.

B. Chafer Frame

Figure 4:
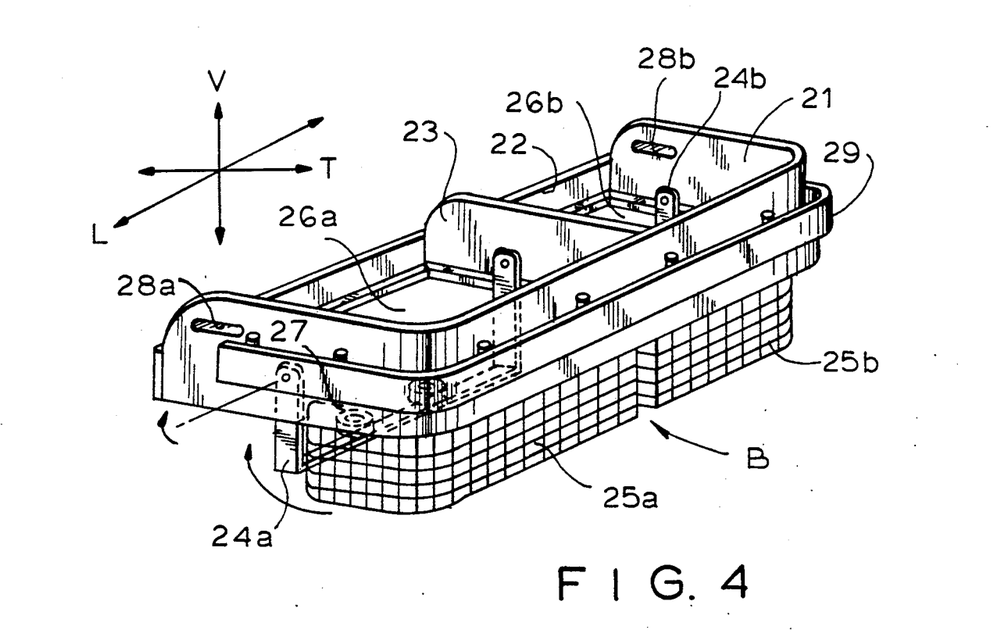
FIG. 4 is a schematic diagram of a chafer frame subassembly for the cart system of FIG. 1.

As shown in FIG. 4, each upper panel of the cart has a frame construction designed to hold one or more chafer pans of respective chafer dish assembly(ies) and associated flame heating element(s). The flame heating element is generally of the type known as STERNO TM cooking fuel, and is positioned below the chafer pan to apply heat to its bottom surface in order to heat water in the pan, which keeps food warm in a double pan immersed therein, or to heat food directly therein. Each chafer frame comprises the following integrally formed components: a main wall 21 which extends from one longitudinal end to the other along a front side of the panel; a back bar 22; and one or more transverse divider wall(s) 23; support members (burner strips) 24a, 24b on which respective heating elements (cooking fuel canisters) are carried.

In the example shown in FIG. 4, the main wall 21, back wall 22, and divider wall 23 are dimensioned to form two rectangular, empty spaces 26a, 26b in which chafer pans of standard or predetermined sizes are located with their peripheral edges supported on the top edges of the walls. Thus, the cart system of the invention provides for the chafer assemblies to be employed integrally with it, as compared with conventional arrangements. The dimensioning and fit of the chafer pan locations ensures that the pans are held on the cart system with an optimal use of space and layout.

At each chafer pan location 26a, 26b, the associated heating element support member 24a, 24b is a U-shaped burner strip having opposing ends pivotably mounted to a side portion of the main wall 21 and the divider wall 23 so as to extend below and across the space of the chafer pan location. Each burner strip has one or more retainer rings or holders 27 in which cooking fuel canisters are placed. The chafer frame may also have two windscrees 25a, 25b for the respective burner strips which are pivotably attached to the lower front edge of the main wall 21. As a principal feature of the invention, the burner strips (and windscreens) are dimensioned and arranged to pivot into and to fit entirely within the rectangular spaces for the chafer pan when the panel (chafer frame) B is pivoted in the vertical direction V.

The chafer frame B has slots 28a, 28b formed at its opposing ends adjacent but spaced a given distance from the back wall 22. The slots are elongated in the horizontal direction and have the ends of pivot pins 19 (see FIG. 1) projecting from the vertical end sections 11a, 11b and 11c, 11d slidingly retained therein. With the chafer frame in the horizontal, service position, the back wall 22 abuts against the upper stretcher bar 13, and the pins 19 are abutted against the back end of the slots 28a, 28b so that the chafer frame in held horizontally by gravity. The spacing of the back end of the slot from the back wall provides suitable leverage for stably holding the frame even with a substantial load placed on the frame. To shift the chafer frame to the vertical, storage position, the front side of the frame is pivoted upwards along a pivot axis aligned with the back ends of the slots 28a, 28b, then once in the vertical position, the entire frame is lowered so that the pivot pins become abutted against the front ends of the slots. In this position, the top edge of the main wall 21 abuts against the upper stretcher bar 13, so that the chafer frame is stably held in the upright position until it is lifted and pivoted back to the service position. A bumper strip 29 spaced outwardly from the main wall 21 may also be provided to protect customers from brushing against the windscreens and as a handle for lifting the front side of the chafer frame.

3. Lower Shelf Assembly

Figure 5A:
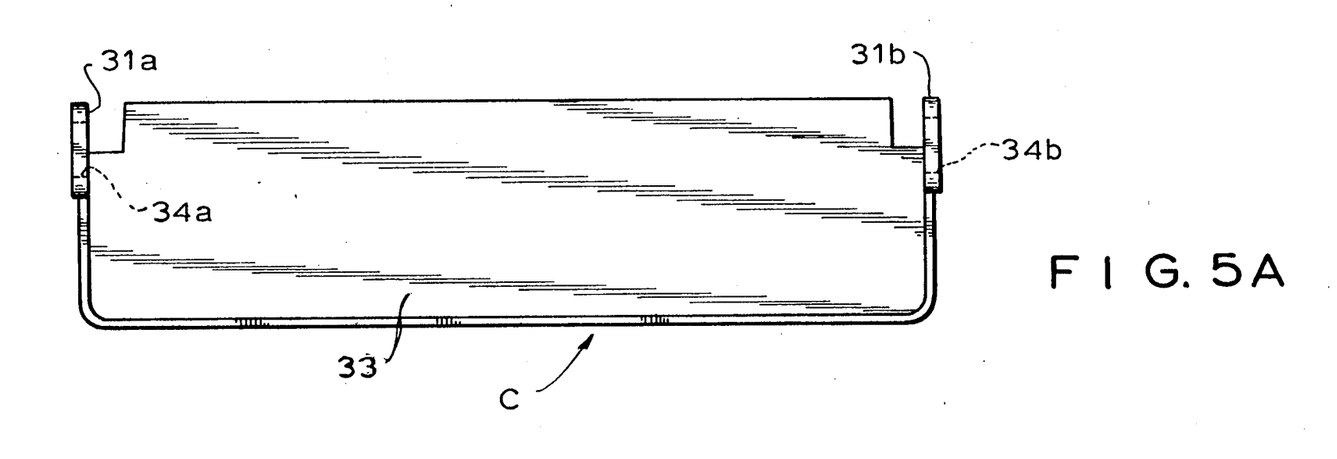
FIG. 5A is a top view and FIG. 5B is an underside view of lower shelf assembly for the cart system of FIG. 1.
Figure 5B:
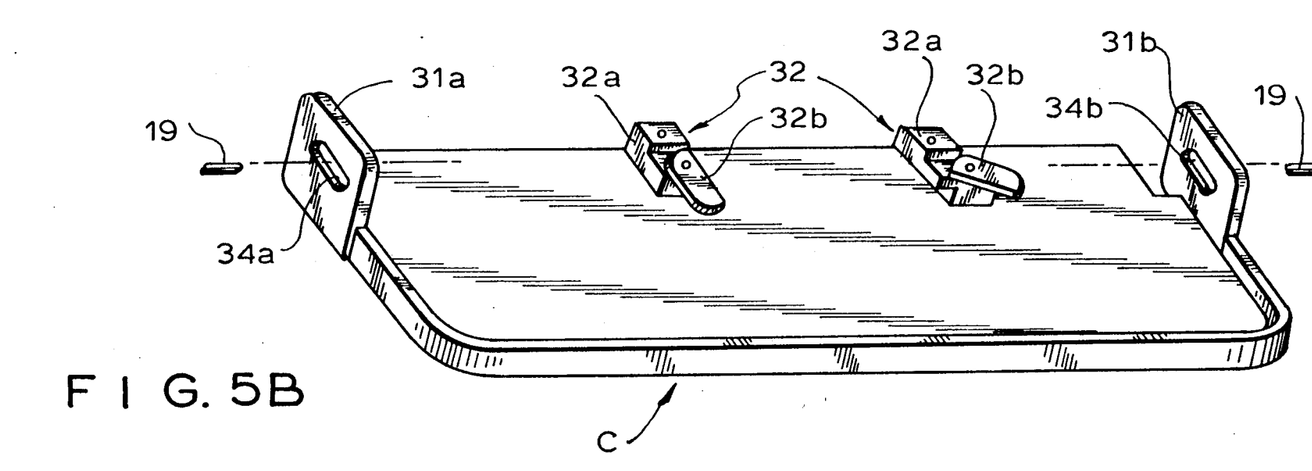

Lower shelves C (see FIG. 1) are provided on each side of the cart frame and are arranged to be pivoted to the vertical position below the chafer frames B. The chafer pans held in the chafer frames during service use are stored on the underside of the lower shelves in the storage position, as shown in FIG. 2. The top of a lower shelf C is shown in FIG. 5A, and the underside is shown in FIG. 5B. The lower shelf has pivot brackets 31a, 31b on its opposing ends in the longitudinal direction, clips 32 on the underside surface of a shelf portion 33, and retainer slots 34a, 34b in the brackets 31a, 31b for retaining the ends of the pivot pins 19 projecting from the end sections of the cart frame (see FIG. 1). The positions and shapes of the pivot brackets and slots are configured to perform the similar function of holding the shelf in the horizontal service position and in the vertical storage position as the slots 28a, 28b, back wall 22, and top edge of the main wall 21 of the chafer frames B.

The clips 32 on the underside of the shelf are used to hold the pans and other accessories to be stored with the cart. The clips have mounting portions 32a, which are spaced from the brackets 34a, 34b and from each other according to the widths of the pans and other accessories to be held therein, and pivotable knobs or catch portions 32b. In order to store an item, the catch portion is first aligned with the mounting portion so that the item can be inserted slidingly between a clip and the opposing clip or bracket. As the item is inserted partway alongside the clip, frictional engagement between the free end of the catch portion 32b and the edge of the item causes the catch portion to pivot until it becomes wedged against the item. The weight of the item (when the shelf is in the vertical storage position) keeps it wedged until it is removed from the storage position. Other types of holding devices may also be used, such as slide rails, screw-type locks, or spring loaded clips, latches, or rollers.

4. Food Shelf Or Coffee Urn Bridqe

Figure 6:
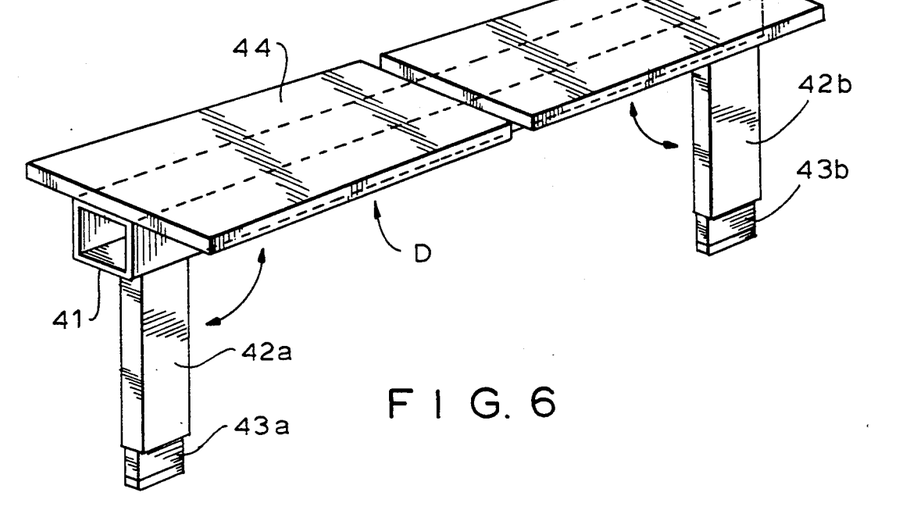
FIG. 6 is a schematic view of a food shelf bridge assembly for the cart system of FIG. 1.
Figure 7:
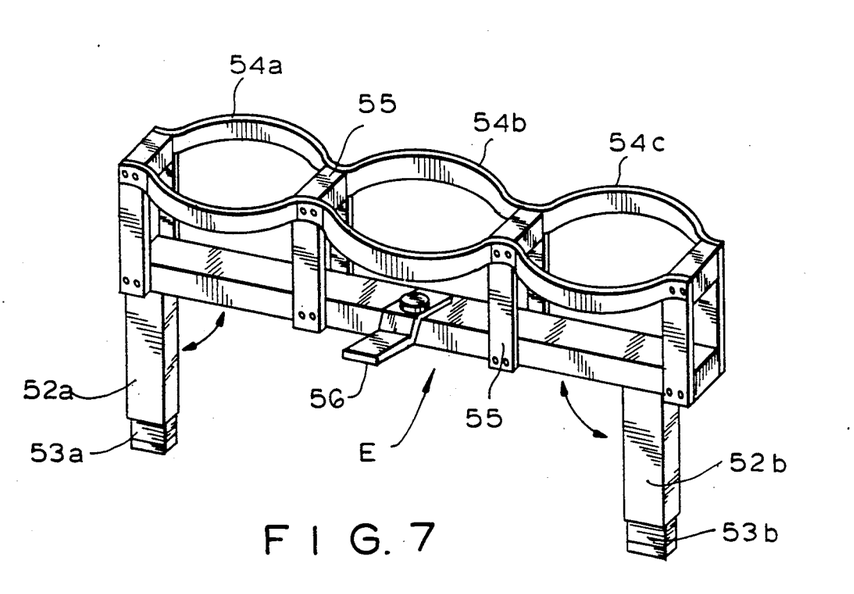
FIG. 7 is a schematic view of a coffee urn bridge assembly for the cart system of FIG. 1.

An elevated bridge can also be employed on the cart system to provide additional food service area or to hold containers for beverages, particularly for hot drink. A food shelf bridge is shown in FIG. 6, and a coffee urn bridge is shown in FIG. 7. Both bridges include a longitudinal support member 41, 51 provided with a pair of support legs 42a, 42b and 52a, 52b spaced apart at opposite ends thereof. The support member may be an aluminum tube extrusion having a U-shaped cross section which is open at the bottom side. The support legs are hinged so that they can be folded inwardly (as indicated by the double-headed arrows) into the hollow bridge channel for compact storage. The ends of the support legs have shoulder portions 43a, 43b and 53a, 53b which fits into the open ends of the support tubes 12a, 12b (see FIG. 3) of the cart frame for mounting the bridge in an elevated position between the chafer frames B (see FIG. 1).

The food shelf bridge D shown in FIG. 6 has a longitudinal shelf portion 44 which can be used as an active service area for food or drink. The coffee urn bridge E shown in FIG. 7 has a plurality of holders 54a, 54b, 54c for drink containers to be placed therein. The holders are supported between upright posts 55 mounted on the support member 51. The coffee urn bridge E is particularly useful for holding coffee urns of the type having a rounded bottom which is wider than the width of the holders such that the coffee urn sits partway in the holder with its bottom surface spaced a short distance from the support member 51. A burner strip 56 can be mounted on the support member 51 with a holder portion, such as for a candle or cooking fuel canister, located below the bottom surface of the coffee urn, as illustrated for the holder 54b in FIG. 7. The bridge may also be designed to hold other items, such as utensils, napkins, signs or decorations.

5. Double Shelf Assembly

Figure 8A:
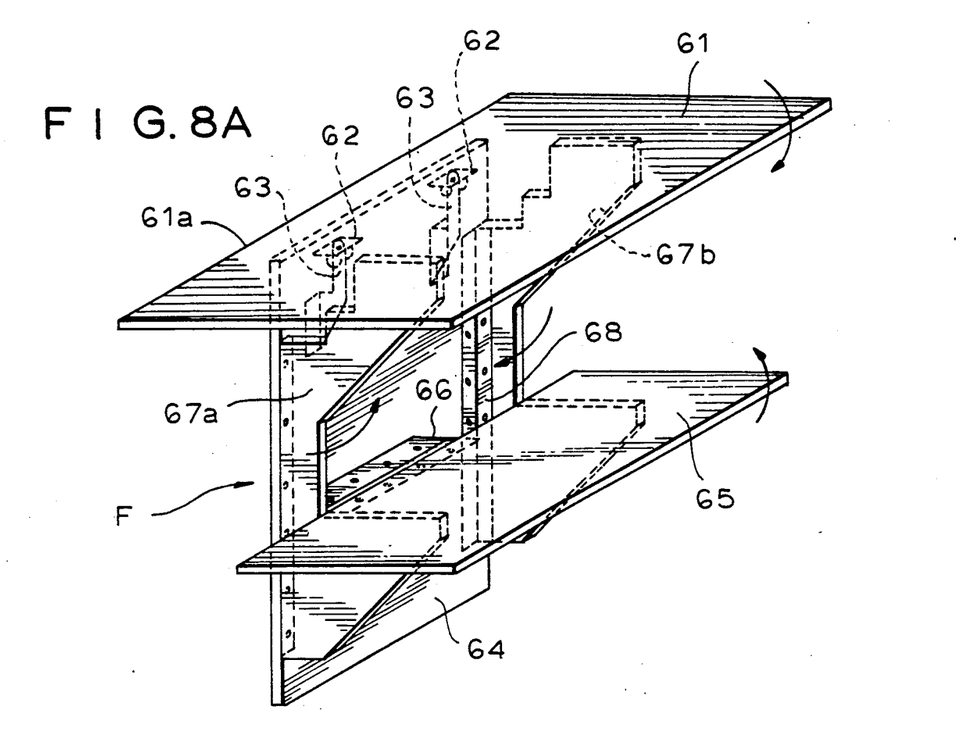
FIG. 8A, 8B and 8C are schematic views of a double shelf assembly for the cart system of FIG. 1.
Figure 8B:
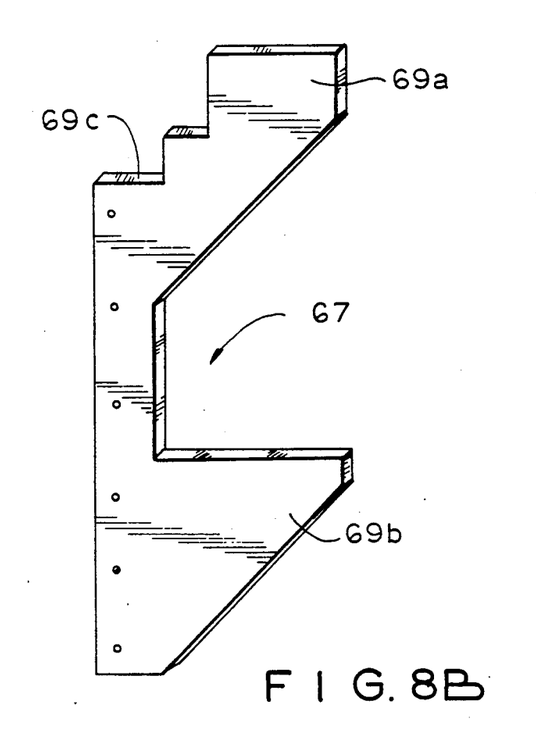
Figure 8C:
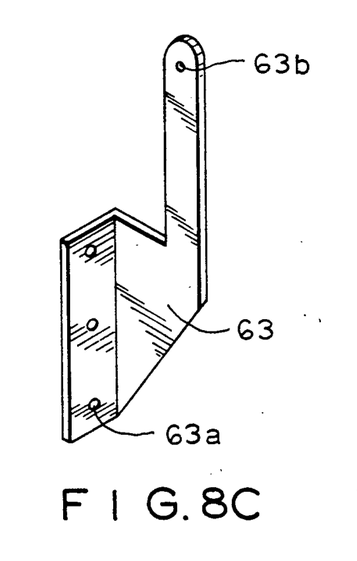

For additional shelf space, a double shelf assembly F may be mounted to the front side of one or both of the vertical end sections 11a, 11b and 11c, 11d of the cart frame A. The assembly is designed to have two shelves which can be collapsed to vertical positions for storage. As shown in FIG. 8A, the assembly includes an upper shelf 61 which has pivot brackets 62 holding pivot pins therein mounted on its underside along the back edge 61a. As shown in FIG. 8C, the pivot arms 63 are each mounted to the back piece 64 by an L-bracket 63a and have a pivot hole 63b at their upper ends for receiving the pivot pins of the pivot brackets 62 therethrough. The upper shelf is thus pivotable to a downwardly collapsed position spaced from the back piece 64 by the position of the pivot axis defined by the brackets 62. A lower shelf 65 is hinged at the center by a horizontal hinge 66 having one leaf fixed to a mounting secured to the back piece 64 and its other leaf secured to the underside of the lower shelf.

Two shelf supports 67a, 67b are hinged by vertical hinges 68 to the back piece 64 and have stepped portions for supporting the upper and lower shelves. As shown in FIG. 8B, the shelf supports each have upper stepped portion 69a and lower stepped portion 69b for supporting the respective shelves. A cutout portion 69c is also shaped to clear the brackets 63. In the storage position, the shelf supports 67a, 67b are pivoted inwardly, and the upper and lower shelves are pivoted downwardly in nested configuration over the shelf supports. Because the upper shelf has its pivot axis spaced out from the back piece 64, it can have relatively large dimensions which overlap the lower shelf and shelf supports folded underneath. The back piece 64 can be mounted directly to the vertical end sections 11a, 11b and 11c, 11d of the cart frame.

6. Awning Assembly

Figures 9A, 9B:
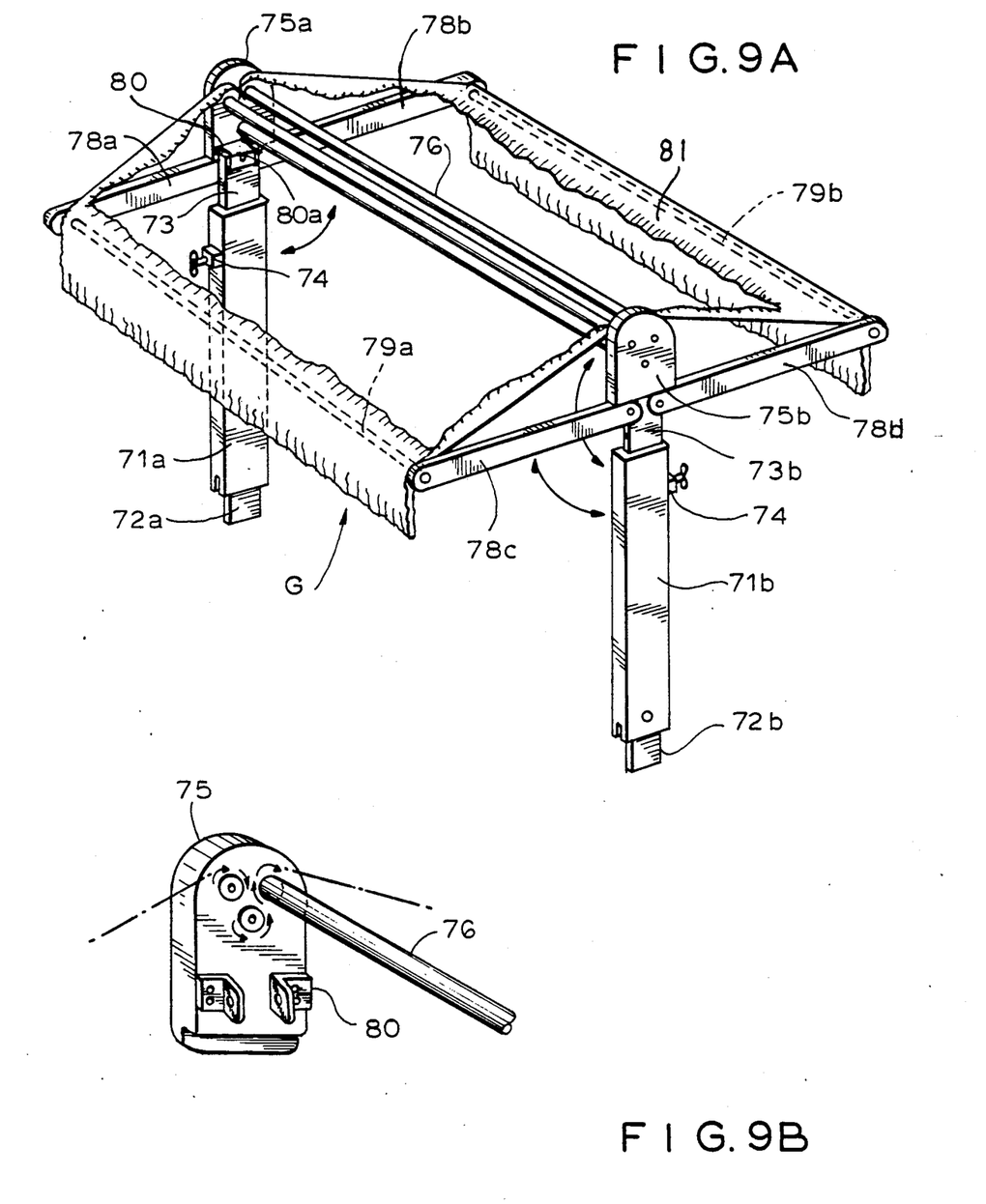
FIG. 9A is a schematic perspective view of an awning assembly for the cart system of FIG. 1.
FIG. 9B is a detailed cutaway view of the awning head.

Referring to FIG. 9A, the awning assembly G has a pair of support tubes 71a, 71b spaced apart in the longitudinal direction with shouldered lower ends 72a, 72b that fit into slots or clamp onto mounting plates behind the handles 16a, 16b of the cart frame A (see FIG. 3). Risers 73a, 73b telescope in the support tubes 71a, 71b and are locked in a selected height position by threading in the lock knobs 74. The upper ends of the risers ar pivotably mounted to pivot brackets 80 carried on awning heads 75a, 75b so that the risers (and support tubes) can be collapsed inwardly (see double headed arrows in FIG. 9A) for storage. Tightening or loosening the riser ends from the pivot brackets is controlled via the threaded knobs 80a.

A pair of awning support arms 78a, 78b and 78c, 78d are pivotably mounted to the upper end of each riser so as to be extendable outwardly in the transverse direction. Stretcher bars 79a, 79b are detachably mounted to the ends of the support arms on each transverse side 78a, 78c and 78b, 78d. An awning membrane 80 is stretched under tension across the stretcher bars 79a, 79b and through a set of head bars 76 extending longitudinally along the central axis of the awning and fixed to the awning heads 75a, 75b. The awning membrane can be made of any suitable material, such as cloth, fabric, or plastic, and particularly, a transparent, high tensile strength plastic.

In the preferred form, the membrane 80 has sleeves formed at its ends on each side through which the stretcher bars 79a, 79b are inserted. The stretcher bars are used to pull the membrane taut under suitable tension and mounted by their ends in holes or recesses formed in the ends of the respective support arms 78a, 78c and 78b, 78d which are pivoted to their extended positions. The support arms are kept from being pulled upward beyond their horizontal positions by abutment of their upper edges with the lower edges of the awning heads 75a, 75b. For storage, the stretcher bars are released from the support arms and used to roll up the membrane, and the support arms are pivoted downward in alignment with the risers and support tubes, and together are pivoted inwardly as described above. Thus, the entire awning assembly can be collapsed for storage within the volume defined by the awning heads 75a, 75b.

As shown in more detail in FIG. 9B, the membrane 80 is wound around the three head bars 76 which extend along the center longitudinal axis of the awning assembly and are spaced closely together equidistantly in a triangular formation. The membrane 80 is wound around the bars in labyrinthine fashion, as indicated by the arrows, such that the mutual friction between opposing portions of the membrane prevents it from being pulled toward one side or the other. Thus, either one or both sides of the awning can be selectively extended as desired, e.g. if the cart is used for service along only one or on both sides. When the membrane 80 is to be replaced or removed for cleaning, the stretcher bars 79a, 79b are removed, and the membrane can be pushed from both sides from around the upper ones of the bars 76.

7. Chafer Accessories

Figures 10A, 10B:
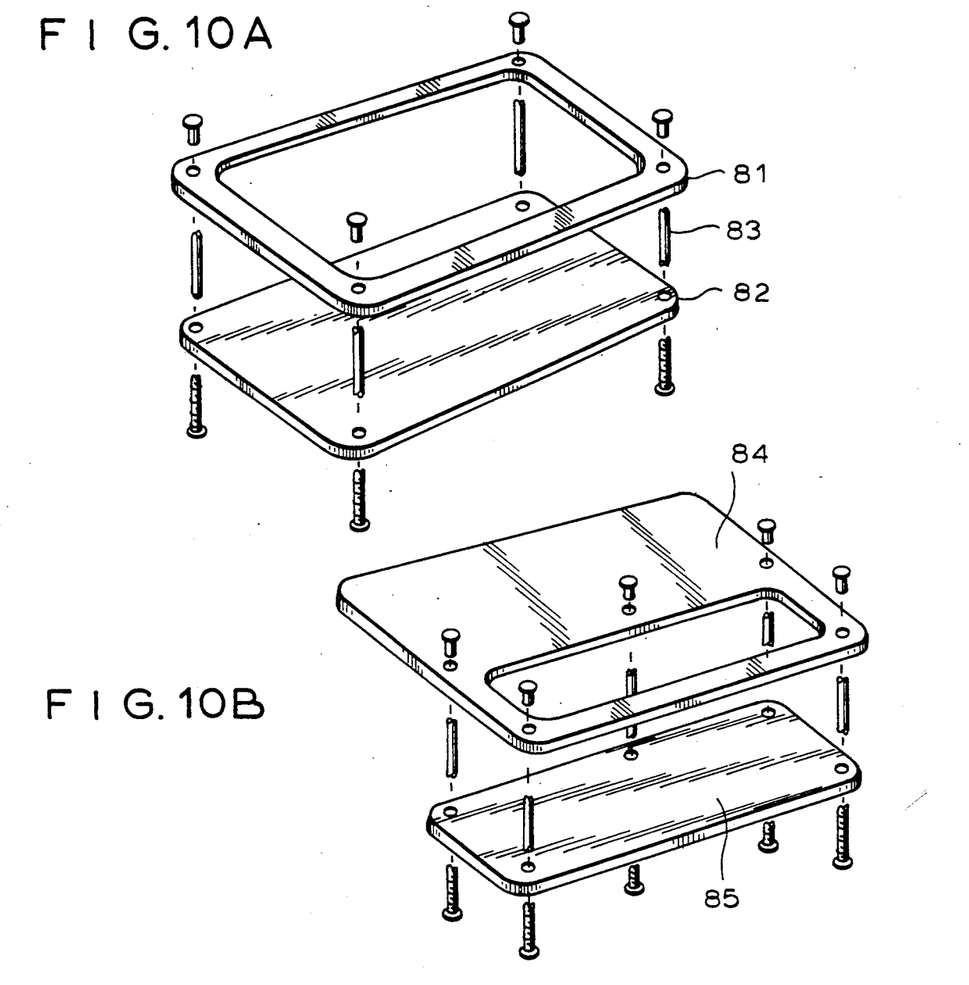
FIGS. 10A, 10B and 10C are schematic views of different chafer accessories for the cart system of FIG. 1.

The utility of the chafer frames, as described above and illustrated in FIG. 4 can be extended by providing complementarily sized and shaped accessories which fit into the spaces defined by the frame walls. For example, FIG. 10A shows a bottle-and-can corral which has an upper rim 81 joined with a lower shelf 82 through spacers 83. The upper rim is dimensioned to rest in nested fashion on the upper edges of the chafre frame walls, with the lower shelf extending into the space defined by the walls. Bottles and cans can then be compactly held within the corral for drink service. The corral can also be made half-sized and used with another half-sized accessory.

Figure 10C:
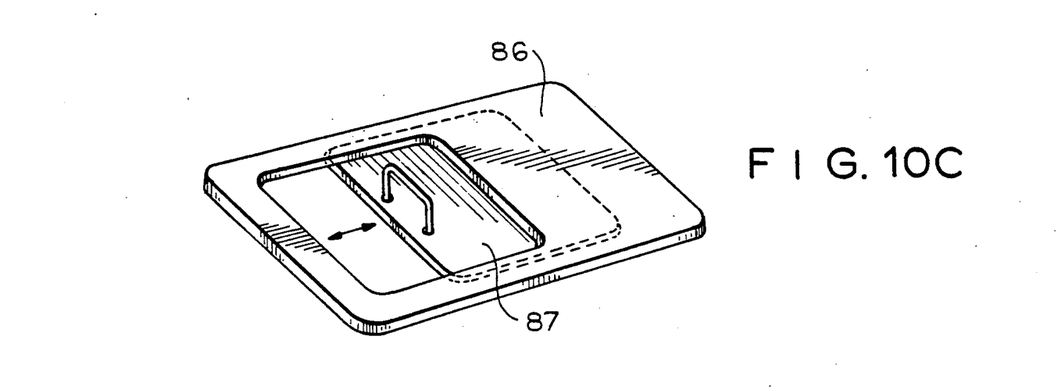

In FIG. 10B, a bar accessory is shown having a combination of a work surface 84 on one part and a bottle holder 85 on another part. FIG. 10C illustrates the top of another accessory having a work surface 86 and a compartment below which is exposed through a sliding door 87. Numerous other variations of food service accessories may of course be designed to fit within the structure of the integrated food service cart. Like the chafer pans, these accessories can be stored on the underside of the lower shelves C in the storage position, as shown in FIG. 2.

From the foregoing description, it will be recognized by those skilled in the art that the present invention provides an integrated food service cart which holds chafer dish assemblies and related accessories conveniently and compactly. The cart frame is made vertically collapsible into the slim volume of the cart's end sections. The chafer frame has built-in spaces for chafer pans and provision for heating elements which are also vertically collapsible. The food shelf or coffee urn bridge and end shelves provide added service space and are removable or collapsible for storage. The awning is readily assembled and is collapsible into a small volume for storage. The chafer pans and accessories have complementary shapes and structures for use and storage on the cart. The invention thus obtains an improved ease of use, service convenience, and compact storage as compared to conventional arrangements.

Numerous modifications and variations are of course possible in light of the principles of the invention disclosed above. All such modifications and variations are intended to be included within the spirit and scope of the invention, as defined in the following claims.

I claim:

1. An integrated food service cart system comprising: a frame;

at least one panel pivotably supported on said frame so as to be pivotable between a horizontal service position and a vertical storage position;

said at least one panel having walls defining a peripheral boundary around at least one space for holding a chafer pan therein;

a support member pivotably mounted to said walls of said panel which extends below said space for holding a chafer pan, wherein said support member has a retaining portion for holding a chafer heating element for applying heat to a chafer pan held in said space for holding said chafer pan when said panel is in the horizontal service position; and pivot portions pivotably mounting said support member to said walls of said panel so as to allow said support member to be pivoted into said space for holding said chafer pan when said panel is pivoted to the vertical storage position.

2. An integrated food service cart system according to claim 1, wherein said frame is formed with a pair of vertical end sections spaced apart along a longitudinal axis of the cart and a stretcher bar extending between said end sections, and further comprising a pair of upper panels symmetrically arranged with respect to the longitudinal axis of said frame and each pivotably supported by respective opposing longitudinal ends thereof on said end sections so as to be pivotable in parallel with each other between the horizontal service positions and vertical storage positions.

3. An integrated food service cart system according to claim 1, wherein each of said upper panels have walls defining a plurality of spaces for holding respective chafer pans therein and mounting respective pivotable support members for the heating elements therefor.

4. An integrated food service cart system according to claim 2, further comprising a pair of lower shelves symmetrically arranged with respect to the longitudinal axis of said frame and each pivotably supported by respective opposing longitudinal ends thereof on said end sections.

5. An integrated food service cart system according to claim 4, wherein said upper panels and lower shelves are pivotable to vertical storage positions one above the other flat against said stretcher bar of said frame, and said support members for the heating elements are pivotable into the respective spaces defined by said upper panel walls, whereby the components of the cart are vertically collapsible into a slim vertical profile of said end sections for compact storage.

6. An integrated food service cart system according to claim 1, further comprising a longitudinal, food shelf or coffee urn bridge having a pair of support legs each disposed at a respective longitudinal end thereof, wherein said end sections include respective vertical tubes with open socket ends for receiving the shouldered ends of said support legs of said bridge to mount it in an elevated position between and above the panels supporting the chafer pans.

7. An integrated food service cart system according to claim 6, further including sliding lock bars which are inserted into holes formed in the vertical tubes and lock into recesses in the support legs of the bridge.

8. An integrated food service cart system according to claim 6, wherein said support legs pivot inwardly and fold into a hollow bridge channel of said bridge for storage.

9. An integrated food service cart system according to claim 2, wherein each of said panels has a pivoting structure including a back bar stop which abuts against said stretcher bar of said frame, and pivot slots formed on its opposite longitudinal ends in which the ends of pivot pins extending from said end sections of said frame are retained so that the panels are held by gravity in the horizontal position with the back bar stop in abutment with the stretcher bar, and can be pivoted upward and moved down along the length of the slots to hold them in the vertical position.

10. An integrated food service cart system according to claim 6, wherein said lower shelves include means for retaining the chafer pans on the undersides thereof for storage when said lower shelves are in their vertical storage positions.

11. An integrated food service cart system according to claim 1, further comprising an awning assembly supported on said frame having a pair of vertical support tubes spaced apart along the longitudinal axis of said frame with lower ends thereof fitting onto said frame.

12. An integrated food service cart system according to claim 11, wherein said awning assembly includes a pair of risers each telescoped into a respective one of said support tubes and held in selected vertical positions therein by an associated retaining element, and a pair of awning heads spaced apart along the longitudinal axis and connected by a head bar extending therebetween, wherein each of said heads is pivotably connected via a pivot bracket to a respective one of said risers to allow them to be folded inwardly along the longitudinal axis for storage.

13. An integrated food service cart system according to claim 11, wherein said awning assembly further includes a pair of awning support arms pivotably mounted to each riser adjacent the respective awning head, said support arms being pivotable so as to extend horizontally outward from said riser in opposite directions transverse to the longitudinal axis, a pair of stretcher bars each mountable by its ends to the corresponding ends of the support arms on each side of said awning assembly in the transverse direction, and an awning membrane which is stretched across said stretcher bars and said head bar.

14. An integrated food service cart system according to claim 13, wherein said awning membrane has sleeves at opposite sides thereof in the transverse direction through which said stretcher bars are inserted.

15. An integrated food service cart system according to claim 13, wherein said head bar comprises three bars which extend along the longitudinal axis of said awning assembly and are spaced closely together equidistantly in a triangular formation, and said membrane is wound around the bars in labyrinthine fashion such that mutual friction between opposing portions of the membrane prevents it from being pulled from said bars toward one transverse side or the other.

16. An integrated food service cart system according to claim 1, further comprising a double shelf assembly including a back piece mounted to said frame, an upper shelf pivotably horizontally mounted to said back piece with its pivot axis spaced from said back piece, a lower shelf pivotably horizontally mounted to said back piece, and a shelf support mounted by a vertical hinge to said back piece and having portions for supporting said upper and lower shelves, wherein said double shelf assembly is collapsible for storage by pivoting said shelf support against said back piece and pivoting said upper and lower shelves downward over each other.

17. An integrated food service cart system according to claim 1, further comprising a chafer accessory having a shape complementary to said chafer pan and means for allowing said accessory to be held in said chafer-pan holding space defined by said panel walls.

18. A collapsible awning assembly comprising:
a pair of vertical support tubes spaced apart along a longitudinal axis of said assembly;
a pair of risers each telescoped into a respective one of said support tubes and held in selected vertical positions therein by an associated retaining element;
a pair of awning heads spaced apart along the longitudinal axis and connected by a head bar extending therebetween, wherein each of said heads is pivotably connected via a pivot bracket to a respective one of said risers to allow them to be folded inwardly along the longitudinal axis for storage;
a pair of awning support arms pivotably mounted to each riser adjacent the respective awning head, said support arms being pivotable so as to extend horizontally outward from said riser in opposite directions transverse to the longitudinal axis;
a pair of stretcher bars each mountable by its ends to the corresponding ends of the support arms on each side of said awning assembly in the transverse direction; and
an awning membrane which is stretched across said stretcher bars and said head bar.

19. A collapsible awning assembly according to claim 18, wherein said awning membrane has sleeves at opposite sides thereof in the transverse direction through which said stretcher bars are inserted.

20. A collapsible awning assembly according to claim 18, wherein said head bar comprises three bars which extend along the longitudinal axis of said awning assembly and are spaced closely together equidistantly in a triangular formation, and said membrane is wound around the bars in labyrinthine fashion such that mutual friction between opposing portions of the membrane prevents it from being pulled from said bars toward one transverse side or the other.

* * * * *